US012634842B2

(12) United States Patent
Maggi et al.

(10) Patent No.: US 12,634,842 B2
(45) Date of Patent: May 19, 2026

(54) TRAFFIC SMOOTHING TO REDUCE EMF EXPOSURE

(71) Applicant: Nokia Solutions and Networks Oy, Espoo (FI)

(72) Inventors: Lorenzo Maggi, Massy (FR); Alois Herzog, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 361 days.

(21) Appl. No.: 18/528,521

(22) Filed: Dec. 4, 2023

(65) Prior Publication Data

US 2025/0184919 A1      Jun. 5, 2025

(51) Int. Cl.
   *H04W 52/36*      (2009.01)
   *H04W 52/02*      (2009.01)
(52) U.S. Cl.
   CPC ..... *H04W 52/367* (2013.01); *H04W 52/0206* (2013.01)
(58) Field of Classification Search
   CPC ........................ H04W 52/367; H04W 52/0206
   See application file for complete search history.

(56) References Cited

U.S. PATENT DOCUMENTS

2023/0354210 A1* 11/2023 Guo .................... H04W 52/143
2025/0212156 A1*  6/2025 Xiong .................... G01S 5/011

FOREIGN PATENT DOCUMENTS

EP        3949175 B1    5/2023
WO     2021/023375 A1    2/2021

OTHER PUBLICATIONS

"Determination of RF field strength, power density and SAR in the vicinity of radiocommunication base stations for the purpose of evaluating human exposure", IEC 62232, Second Edition, Aug. 2017, pp. 1-16.
"Case studies supporting IEC 62232—Determination of RF field strength, power density and SAR in the vicinity of radiocommunication base stations for the purpose of evaluating human exposure", IEC TR 62669, Second Edition, Apr. 2019, pp. 1-13.
"Determination of RF field strength, power density and SAR in the vicinity of base stations for the purpose of evaluating human exposure", IEC 62232, Third Edition, Aug. 2022, 21 pages.

(Continued)

*Primary Examiner* — Melvin C Marcelo
(74) *Attorney, Agent, or Firm* — Nokia Technologies Oy

(57)        ABSTRACT
A base station determines a power threshold to use for transmission in a sampling period in order to meet a power requirement defined to limit an amount of a function of radiated power, at least by: determining a set of admissible power thresholds; measuring overshoot in transmitted power; and computing the power threshold to be used for the transmission, as a function of the measured overshoot and the set of admissible power thresholds, to form the determined power threshold. The base station performs the transmission in the sampling period using the determined power threshold. Periodically, a set of hyper-parameters is found that improve expected performance in terms of power threshold fairness using multiple power thresholds and corresponding multiple power consumption values. The hyper-parameters are then used at least to computer the power thresholds used for transmission.

20 Claims, 6 Drawing Sheets

(56)          References Cited

OTHER PUBLICATIONS

"Guidelines For Limiting Exposure To Electromagnetic Fields (100 Khz To 300 Ghz)", Health Physics, vol. 118, No. 5, May 2020, pp. 483-524.

"3rd Generation Partnership Project; Technical Specification Group Core Network and Terminals; 5G System; Network Data Analytics Services; Stage 3 (Release 17)", 3GPP TS 29.520, V17.6.0, Mar. 2022, pp. 1-218.

"3rd Generation Partnership Project; Technical Specification Group Services and System Aspects; Policy and charging control framework for the 5G System (5GS); Stage 2 (Release 17)", 3GPP TS 23.503, V17.5.0, Jun. 2022, pp. 1-148.

Tornevik et al., "Time Averaged Power Control of a 4G or a 5G Radio Base Station for RF EMF Compliance", IEEE Access, vol. 8, Dec. 8, 2020, pp. 211937-211950.

Castellanos et al., "Hybrid precoding for millimeter wave systems with a constraint on user electromagnetic radiation exposure", 50th Asilomar Conference on Signals, Systems and Computers, Nov. 6-9, 2016, pp. 296-300.

Nasim et al., "Mitigation of Human EMF Exposure in a Cellular Wireless System", IEEE 92nd Vehicular Technology Conference (VTC2020-Fall), Nov. 18-Dec. 16, 2020, 5 pages.

"3rd Generation Partnership Project; Technical Specification Group Radio Access Network; NG-RAN; F1 application protocol (F1AP) (Release 17)", 3GPP TS 38.473, V17.1.0, Jun. 2022, pp. 1-667.

Finnish Provisional Application No. 20226115, "Determining A Radio Transmission Power Threshold, And Related Devices, Methods And Computer Programs", filed on Dec. 16, 2022, pp. 1-36.

Neely,"Stochastic Network Optimization with Application to Communication and Queueing Systems", Synthesis Lectures on Communication Networks, 2010, 209 pages.

Kolda et al., "Optimization by Direct Search:New Perspectives on SomeClassical and Modern Methodss", SIAM Review, vol. 45, No. 3, 2003, pp. 385-482.

Office action received for corresponding Finnish Patent Application No. 20226159, dated May 15, 2023, 14 pages.

Lee et al., "Energy efficient scheduling and power control of massive MIMO in massive IoT networks", Expert Systems with Applications, vol. 200, Article 116920, Aug. 15, 2022, pp. 1-16.

Merluzzi et al., "Energy-Efficient Dynamic Edge Computing with Electromagnetic Field Exposure Constraints", Joint European Conference on Networks and Communications & 6G Summit (EuCNC/ 6G Summit): Wireless, Optical and Satellite Networks (WOS), Jun. 7-10, 2022, pp. 202-207.

Office action received for corresponding Finnish Patent Application No. 20226159, dated Oct. 23, 2023, 13 pages.

Extended European Search Report received for corresponding European Patent Application No. 23211900.8, dated May 7, 2024, 8 pages.

* cited by examiner

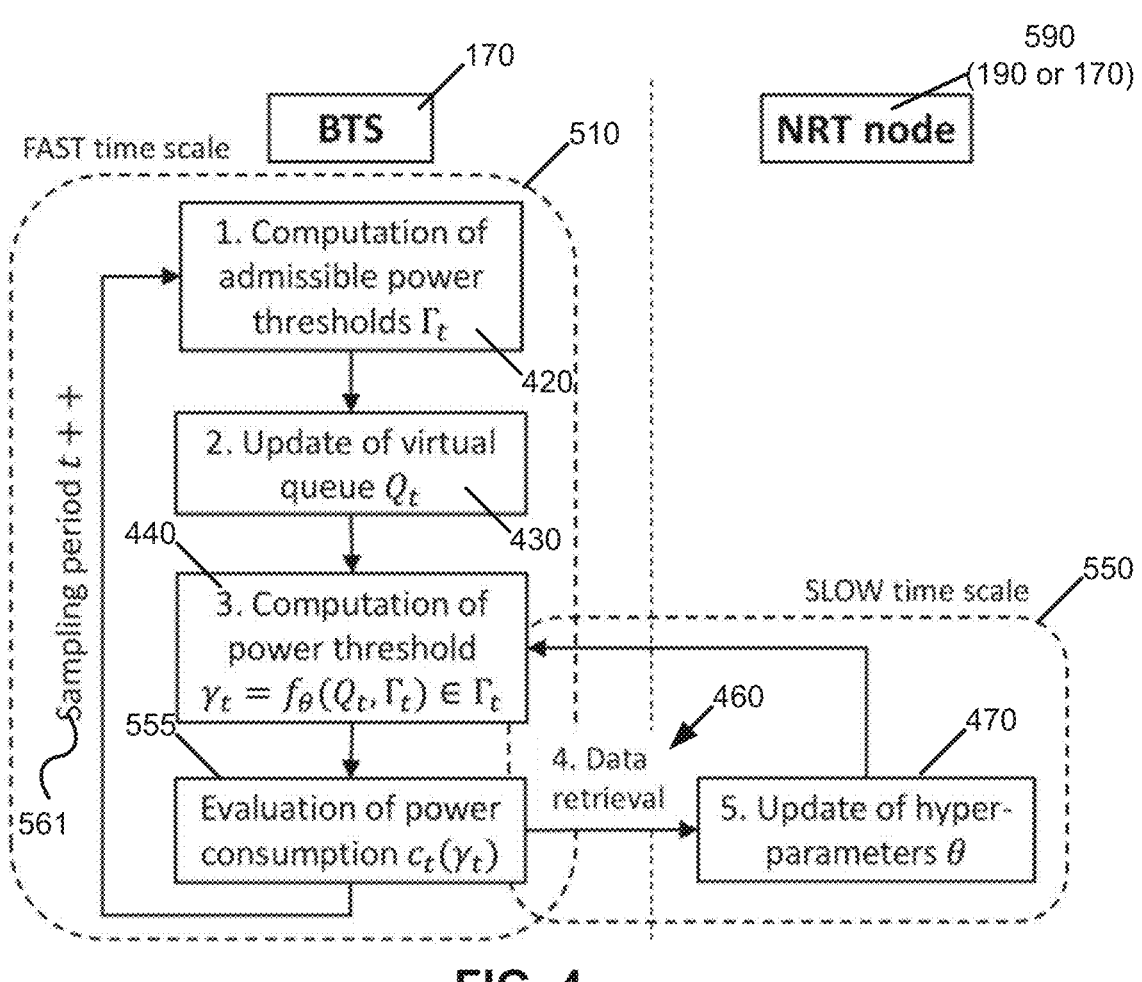

590
(190 or 170)

NRT node

FAST time scale

BTS 170

510

1. Computation of admissible power thresholds $\Gamma_t$

420

2. Update of virtual queue $Q_t$

430

440

555

3. Computation of power threshold $\gamma_t = f_\theta(Q_t, \Gamma_t) \in \Gamma_t$ SLOW time scale 550

460

4. Data retrieval

470

561

Evaluation of power consumption $c_t(\gamma_t)$

5. Update of hyper-parameters $\theta$

Sampling period $t++$

Find the hyper-parameter vector value $\theta$ maximizing the expected performance in terms of power threshold fairness

581

Estimate the value of performance $H(\theta)$ (which is based on fairness) in correspondence of the hyper-parameters used in multiple batches of sampling periods

583

To find the optimal set of hyper parameters ($\theta$) at a batch $i$, retrieve previously stored choices of sets and corresponding performances, and use a technique allowing optimization of a function by just sampling it at selected points

FIG. 4A

TRAFFIC SMOOTHING TO REDUCE EMF EXPOSURE

RELATED APPLICATION

This application claims benefit of priority from Finnish Patent App. No 20226159, filed Dec. 23, 2022, the disclosure of which is hereby incorporated in its entirety by reference herein.

TECHNICAL FIELD

Exemplary embodiments herein relate generally to wireless communications and, more specifically, relates to transmission of radio frequency signals to reduce human exposure to electromagnetic fields (EMFs).

BACKGROUND

Wireless communication networks such as cellular networks use radio frequency (RF) transmissions from antennas operated by a base station. One issue with these transmissions is the amount of electromagnetic field (EMF) generated, e.g., per unit of time. In particular, there are maximum amounts of EMF exposure that exist and that must be met by wireless systems.

Wireless communication systems use various techniques in order to be able to ensure that the maximum amount of EMF exposure is not exceeded. These techniques could be improved.

BRIEF SUMMARY

This section is intended to include examples and is not intended to be limiting.

In an exemplary embodiment, a method is disclosed that includes determining by a base station a power threshold to use for transmission in a sampling period in order to meet a power requirement defined to limit an amount of a function of radiated power, comprising: determining a set of admissible power thresholds; measuring overshoot in transmitted power; and computing the power threshold to be used for the transmission, as a function of the measured overshoot and the set of admissible power thresholds, to form the determined power threshold. The method includes performing by the base station the transmission in the sampling period using the determined power threshold.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: determining by a base station a power threshold to use for transmission in a sampling period in order to meet a power requirement defined to limit an amount of a function of radiated power, comprising: determining a set of admissible power thresholds; measuring overshoot in transmitted power; and computing the power threshold to be used for the transmission, as a function of the measured overshoot and the set of admissible power thresholds, to form the determined power threshold; performing by the base station the transmission in the sampling period using the determined power threshold.

An exemplary computer program product includes a computer-readable storage medium bearing instructions that, when executed by an apparatus, cause the apparatus to perform at least the following: determining by a base station a power threshold to use for transmission in a sampling period in order to meet a power requirement defined to limit an amount of a function of radiated power, comprising: determining a set of admissible power thresholds; measuring overshoot in transmitted power; and computing the power threshold to be used for the transmission, as a function of the measured overshoot and the set of admissible power thresholds, to form the determined power threshold; performing by the base station the transmission in the sampling period using the determined power threshold.

In another exemplary embodiment, an apparatus comprises means for performing: determining by a base station a power threshold to use for transmission in a sampling period in order to meet a power requirement defined to limit an amount of a function of radiated power, comprising: determining a set of admissible power thresholds; measuring overshoot in transmitted power; and computing the power threshold to be used for the transmission, as a function of the measured overshoot and the set of admissible power thresholds, to form the determined power threshold; performing by the base station the transmission in the sampling period using the determined power threshold.

In an exemplary embodiment, a method is disclosed that includes receiving multiple power thresholds used by a base station for transmission over multiple time periods and corresponding multiple power consumption values over those multiple time periods. The method includes finding a set of hyper-parameters that improve expected performance in terms of power threshold fairness using the multiple power thresholds and multiple power consumption values. The method also includes sending the set of hyper-parameters to the base station for use by the base station for determination of power thresholds for transmission.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving multiple power thresholds used by a base station for transmission over multiple time periods and corresponding multiple power consumption values over those multiple time periods; finding a set of hyper-parameters that improve expected performance in terms of power threshold fairness using the multiple power thresholds and multiple power consumption values; and sending the set of hyper-parameters to the base station for use by the base station for determination of power thresholds for transmission.

An exemplary computer program product includes a computer-readable storage medium bearing instructions that, when executed by an apparatus, cause the apparatus to perform at least the following: receiving multiple power thresholds used by a base station for transmission over multiple time periods and corresponding multiple power consumption values over those multiple time periods; finding a set of hyper-parameters that improve expected performance in terms of power threshold fairness using the multiple power thresholds and multiple power consumption values; and sending the set of hyper-parameters to the base station for use by the base station for determination of power thresholds for transmission.

In another exemplary embodiment, an apparatus comprises means for performing: receiving multiple power thresholds used by a base station for transmission over multiple time periods and corresponding multiple power consumption values over those multiple time periods; finding a set of hyper-parameters that improve expected performance in terms of power threshold fairness using the multiple power thresholds and multiple power consumption values; and sending the set of hyper-parameters to the base station for use by the base station for determination of power thresholds for transmission.

BRIEF DESCRIPTION OF THE DRAWINGS

In the attached Drawing Figures:

FIG. 4 illustrates how the method of FIG. 3 may be implemented by modules executed on two devices (or one device);

FIG. 4A is a flowchart of updating hyper-parameters and is performed by an NRT node;

DETAILED DESCRIPTION OF THE DRAWINGS

Figure 1:
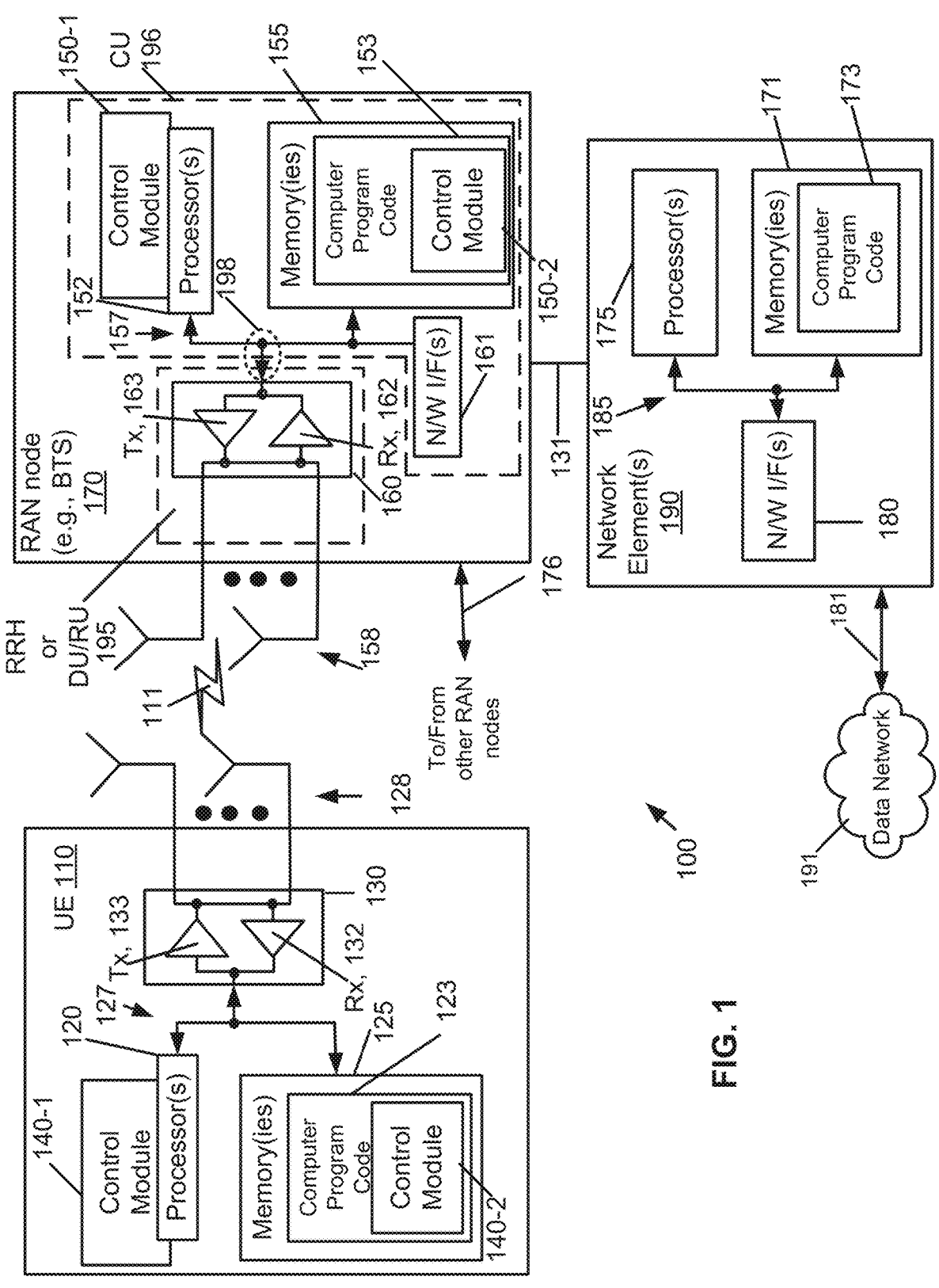
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The exemplary embodiments herein describe techniques for traffic smoothing to reduce human exposure to EMFs. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100.

A UE is a wireless, typically mobile device that can access a wireless network. The UE 110 includes circuitry comprising one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 will be referred to as a BTS, as this can apply to 5G, 4G, and earlier standards, although this is only one example. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-DU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes circuitry comprising one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes circuitry comprising one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

Having thus introduced one suitable but non-limiting technical context for the practice of the exemplary embodiments, the exemplary embodiments will now be described with greater specificity. Before proceeding, however, with more details about the exemplary embodiments, an overview of the technical area into which the embodiments may reside is presented.

It is noted that a number of cited references are used herein. These are indicated by a number within a parenthetical (e.g., [4]) and a list of the references is at the end of the Detailed Description.

Concerning EMF exposure, with the introduction of a new generation of mobile networks, questions are being raised about compliance aspects related to the RF EMF exposure from the radio transmitters, which includes 5G. Compliance assessment methods have been specified in IEC62232:2017. See [1], IEC 62232:2017, "Determination of RF field strength, power density and SAR in the vicinity of radiocommunication base stations for the purpose of evaluating human exposure", August 2017. The practical implementation has been demonstrated in IEC TR 62669: 2019 (see [2], IEC TR 62669:2019, "Case studies supporting IEC 62232—Determination of RF field strength, power density and SAR in the vicinity of radiocommunication base stations for the purpose of evaluating human exposure", April 2019), and further improvements have been specified in IEC62232 ED3 106/550/CDV (see [3], TEC 62232 ED3 CDV (106/550/CDV), "Determination of RF field strength, power density and SAR in the vicinity of radiocommunication base stations for the purpose of evaluating human exposure", July 2021) in order to take into account the actual maximum approach, i.e. leveraging the actual exposure using an averaging time $T_{avg}$ of 1 to 30 minutes as specified in international guidelines like ICNIRP (see [4], ICNIRP-2020, International Commission on Non-Ionizing Radiation Protection (ICNIRP), "Guidelines for limiting exposure to electromagnetic fields (100 kHz to 300 GHz)", Health Physics, 118(5):483-524; 2020).

To respond to the EMF regulations and operators' requests, different radio product features have been issued related to actual EIRP control and monitoring and based on at least some information from [5], WO 2021/023375, "Method for controlling radio frequency emissions". These features may include an EIRP monitor, EIRP control, and Actual EIRP Control Extensions.

The actual EIRP Monitor and Control features, for instance, may introduce the following:

1) A first step is implementation of the compliance approach according to IEC TR 62669:2019 and IEC 62232 ED3 draft.
2) Monitoring of radio emissions per cell or per cell segment is performed via power or EIRP counters, so that transmitted power of a beamforming antenna becomes transparent and the possible need for EIRP control can be derived.
3) Configurable EIRP thresholds per cell segment are used and they are controlled to meet regulator figures of transmitted power in a 1 to 30 minutes sliding window with a 1-minute step.
4) Monitoring support is performed for sub-6 GHz (FR1) frequency ranges and TDD/FDD technology (note that equivalent features are also planned for FR2).

It should be noted that the present description applies to the control of radio emissions in general. Various quantities may be controlled by using the disclosed apparatus, base station, central entity and methods, for example radiated power or EIRP (Equivalent Isotropic Radiated Power—which combines power and gain). In the following of the description, EIRP is referred to by way of example, but this is not limitative.

Before proceeding with additional description, the following table is presented to define variables used in various equations herein.

| Variable | Definition |
|---|---|
| $\overline{C}$ | Pre-defined EIRP limit |
| $c_t$ | EIRP consumption function within sampling period t = 0, 1, . . . |
| $\gamma$ | EIRP threshold |
| $\gamma_t$ | EIRP threshold that is controlled for period t |
| W | number of sampling periods within the time window $T_{avg}$ |
| $T_{avg}$ | Sliding time window for power averaging |
| $\rho\overline{C}$ | Minimum level of EIRP |
| $\beta$, V, $\rho$ | Hyper-parameters that control the behavior of the traffic smoothing method |
| $\theta$ | The set of hyper-parameters $\beta$, V, $\rho$ |
| $\gamma^{TB}$ | Token bucket threshold |
| $c(\gamma)$ | The sliding average of a function's (e.g., the EIRP) transmitted power |
| $Q_t$ | Virtual queue |
| $\Gamma_t$ | set of admissible thresholds |
| $f_\theta(Q_t, \Gamma_t)$ | a function of the virtual queue $Q_t$ and of the set of admissible thresholds $\Gamma_t$ |
| $h(.)$ | Fairness function |

Concerning a feature for actual EIRP control, there may be a feature that blanks PRBs such that the EIRP averaged over a sliding window of duration $T_{avg}$ (=1 to 30 min) is not greater than a pre-defined limit $\overline{C}$.

More formally, let $c_t$ be an EIRP consumption function within sampling period t=0, 1, . . . . Each sampling period (also simply called period) has a duration of 100 ms-1 sec. Let $\gamma_t$ be the EIRP threshold that is controlled by the feature, and that ensures that $c_t(\gamma_t) \leq \gamma_t$. Then, the feature controls thresholds $\gamma$ such that:

$$\frac{1}{W}\sum\nolimits_{i=t-min(t,W-1)}^{t} c_i(\gamma_i) \leq \overline{C}, \forall t \geq 0,$$

where W is the number of sampling periods within the time window $T_{avg}$.

The average EIRP over $T_{avg}$ seconds is also commonly referred to as actual EIRP.

The feature is also able to guarantee a constant minimum level $\rho\overline{C}$ (with $0 \leq \rho \leq 1$) of service. This is especially important in the presence of GBR traffic, but also to prevent any PRB starvation at any time. This amounts to ensuring that the EIRP threshold $\gamma$ can be set at any period to a value of at least $\rho\overline{C}$, that is:

$$\gamma_t \geq \rho\overline{C}, \forall t \geq 0.$$

The feature has two loops: the outer one works at rounds of 'sampling periods', e.g., every 100 ms. The outer loop controls the budget over the sliding window at round of "sampling periods". On the other hand, the inner loop controls the budget within a single sampling period.

Another consideration for the outer loop is a token bucket (TB). The so-called token bucket (TB) mechanism keeps track of the remaining available EIRP budget, i.e., the maximum EIRP consumption allowed to be consumed for Non-Guaranteed Bit Rate (Non-GBR) traffic over the next sampling period while fulfilling constraints (1) and (2), shown below, i.e., $$TB_t = \bar{C}(1-\rho)W - \sum_{i=1}^{min(t,W-1)}\left[c_{t-i} - \rho\bar{C}\right]^+, \forall\, t \geq 0,$$

where $[x]^+ := \max(x, 0)$ is the positive part of x.

In other words, $TB_t$ computes the gap between the total budget for non-GBR traffic $\bar{C}(1-\rho)W$ and the EIRP consumption excess $[c-\rho\bar{C}]^+$ with respect to the guaranteed level $\rho\bar{C}$ over the last W sampling periods.

Note that solution $\gamma^{TB}$ implicitly considers any past consumption below the guaranteed level $\rho\bar{C}$ as equal to $\rho\bar{C}$, which makes this technique overly conservative. The patent application [9], NC326879, "Maximum Radio Emission Under Sliding Average Upper Limit and Traffic Guarantees Lower Limit" addresses this and allows for higher threshold and more served traffic.

Then, the EIRP reduction $\gamma_t$ is computed as the guaranteed level $\rho\bar{C}$ plus the remaining budget of non-guaranteed traffic, i.e., $$\gamma_t^{TB} = \rho\bar{C} + TB_t, \forall\, i \geq 0. \qquad (1)$$

With respect to the inner loop, once the EIRP reduction factor $\gamma_t$ is updated at the beginning of period t by the outer loop, a different mechanism caps the effective EIRP consumption during sampling period t to the EIRP threshold $\gamma_t^{TB}$ computed by the outer loop.

It is noted that there are other options for the EIRP control inner loop. As mentioned above, once the EIRP threshold $\gamma_t$ is decided for the next sampling period t, it is possible to decide (in the inner loop) the number of sub-carriers that the scheduler can use to serve users. However, this is not the only possible option. One may also:

1) control the power of the beam allocated to a specific user and at a specific slot;
2) control the gain of the beam used by each user in each slot; and/or
3) control jointly (a subset of) a number of carriers, beam power and beam gain. That is, all or less than all (a subset) of a number of carriers could be controlled.

The techniques herein may apply to all the options above, since these techniques improve upon the outer loop control method.

In general, the techniques herein may allow a base station such as BTS 170 to cap (a function of) its emitted power by a threshold $\gamma_t$ across period t=0, 1, . . . such that (as examples) the average power never exceeds a pre-defined limit over a sliding window, a minimum level traffic level is guaranteed, and fairness across users is maximized in terms of connectivity and delay. This can translate into ensuring that thresholds are as high as possible, at any time.

More formally, certain exemplary embodiments herein allow the base station to tune a threshold $\gamma_t$ across periods t=0, 1, . . . and ensure that the following goals can be met.

a) the thresholds are as high as possible at any time. In particular, the power threshold never drops too low and its behavior over time is smooth. A rational for this is ensuring seamless connectivity to all users and optimizing delay fairness across users. On the other hand, a legacy token bucket technique shows an ON-OFF behavior (see FIG. 2, described below) which jeopardizes user delay fairness and seamless connectivity.

b) (a function of) the emitted power $c_t$ across sampling periods t=0, 1, . . . , capped by threshold $\gamma_t$ (i.e., $c_t(\gamma_t) \leq \gamma_t$, $\forall_t$) and averaged over a sliding window of W periods, should not exceed a pre-defined limit $\bar{C}$:

$$\frac{1}{W}\sum_{i=t-min(t,W-1)}^{t} c_i(\gamma_i) \leq \bar{C}, \quad \forall\, t \geq 0. \qquad (2)$$

A rational for this is, when the function of the emitted power is the EIRP (Effective Isotropic Radiated Power), then such constraint allows the BTS to comply with standard EMF exposure health regulations, see [1].

c) a minimum emission level $\rho\bar{C}$ can be guaranteed, with $0 \leq \rho \leq 1$. In other words, the threshold never drops below $\rho\bar{C}$, i.e., $$\gamma_t \geq \rho\bar{C}, \quad \forall\, t \geq 0. \qquad (3)$$

A rational for this is ensuring a minimum level of service. This is important especially in the presence of GBR traffic. In this case, $\rho$ should exceed the (instantaneous) portion of GBR traffic being served at the BTS.

Concerning a token bucket technique currently being used, the token bucket threshold $\gamma^{TB}$ technique as described might not achieve goal (a). In fact, the legacy token bucket policy is a greedy one: the whole remaining EIRP budget $\gamma_t^{TB}$ that can be consumed to still fulfill constraint (2) can be depleted during period t, which under high traffic translates to an ON-OFF behavior of EIRP thresholds (see FIG. 2) that causes the following:

A) resource starvation for a non-negligible number of consecutive periods;
B) considerable delay (and eventually, packet drop) to those users attempting to transmit during OFF periods, and hence, delay fairness is unsatisfactory; and
C) jittery service to, potentially, all users.

Figure 2:
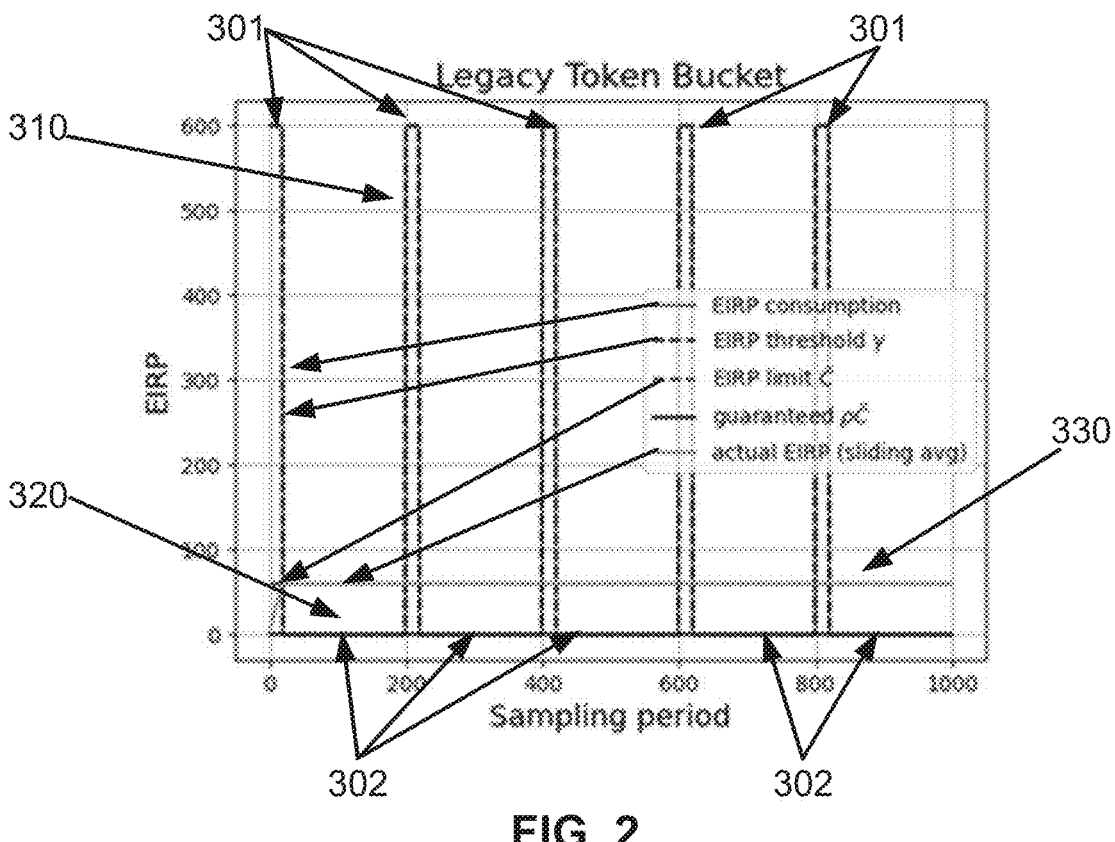
FIG. 2 is an illustration of ON-OFF behavior of a token bucket mechanism in case of high traffic.

With reference to FIG. 2, this figure provides an illustration of ON-OFF behavior of a token bucket mechanism in case of high traffic. FIG. 2 is a graph of EIRP versus sampling period and shows actual EIRP (sliding average), guaranteed $\rho\bar{C}$, EIRP limit $\bar{C}$, EIRP threshold $\gamma$, and EIRP consumptions. ON periods 301 and OFF periods 302 are shown. Reference 310 indicates a region (an ON period 301) in which the TB algorithm greedily uses all of the remaining budget. Reference 320 indicates a region (an OFF period 302) where there is budget depletion leading to resource starvation (as in (A) above). Reference 330 indicates that this satisfies a constraint where average (actual) EIRP is equal to the limit $\bar{C}$. It can be seen that there can be considerable delay (see (B) above) for a user attempting to transmit during the OFF periods 302, as the user has to wait for any response until the ON period, and jitter can occur because transmissions only happen in short ON periods 301.

There exist a few techniques to control actual EIRP over a sliding time window, which are listed below.

There are features (including at least in part from reference [5]) that implement a token bucket mechanism to control the maximum power that can be emitted at each sampling period (e.g., 100 ms up to is long). The power control is implemented by leaving intact the power per OFDM symbol, and instead limiting the number of sub-carriers (hence, of OFDM symbols) that can be used at any slot.

The techniques in [9] (NC326879, "Maximum Radio Emission Under Sliding Average Upper Limit and Traffic Guarantees Lower Limit") allow the BTS to compute the maximal range of admissible threshold while fulfilling actual EIRP constraint and minimum traffic guarantees.

Ericsson uses techniques in [8] (Christer Tornevik et al. "Time Averaged Power Control of a 4G or a 5G Radio Base Station for RF EMF Compliance", IEEE Access, December 2020) to control the transmission power by acting directly on the emitted power per OFDM symbol.

There also exist other methods to limit EIRP, by addressing beamforming [7] (M. R. Castellanos, D. J. Love, and B. M. Hochwald, "Hybrid precoding for millimeter wave systems with a constraint on user electromagnetic radiation exposure," in 2016 50th Asilomar Conference on Signals, Systems and Computers. IEEE, 2016, pp. 296-300) or the user-to-base station assignment [8] (I. Nasim and S. Kim, "Mitigation of human EMF exposure in a cellular wireless system," in 2020 IEEE 92nd Vehicular Technology Conference (VTC2020-Fall). IEEE, 2020, pp. 1-5). Exemplary embodiments herein do not address the techniques in these two options.

Exemplary embodiments herein improve upon legacy techniques as described previously, since the maximal remaining EIRP budget is provably higher than or equal to the token bucket one at any time. An exemplary approach herein applies to options such as limiting the number of sub-carriers or the power per RE or both, and specifically improves upon conventional outer-loop mechanisms by ensuring a smooth EIRP behavior over time.

Moreover, exemplary embodiments herein allow the BTS to compute the maximal range of admissible threshold while fulfilling an actual EIRP constraint and minimum traffic guarantees. Exemplary embodiments may choose a threshold within such maximal range, in order to smooth out EIRP threshold over time.

Concerning the loops describes above, exemplary techniques herein may not affect the inner loop, and therefore may be independent of how such inner loop is implemented. Exemplary embodiments also correct the above-mentioned issues on resource starvation, delay, and jitter. In particular, an exemplary method pre-emptively reduces the EIRP threshold when needed, so as to never deplete the EIRP budget completely and guarantee high and smooth EIRP threshold. This ensures seamless connectivity, low traffic jitter, and high user delay fairness at any time.

Figure 3:
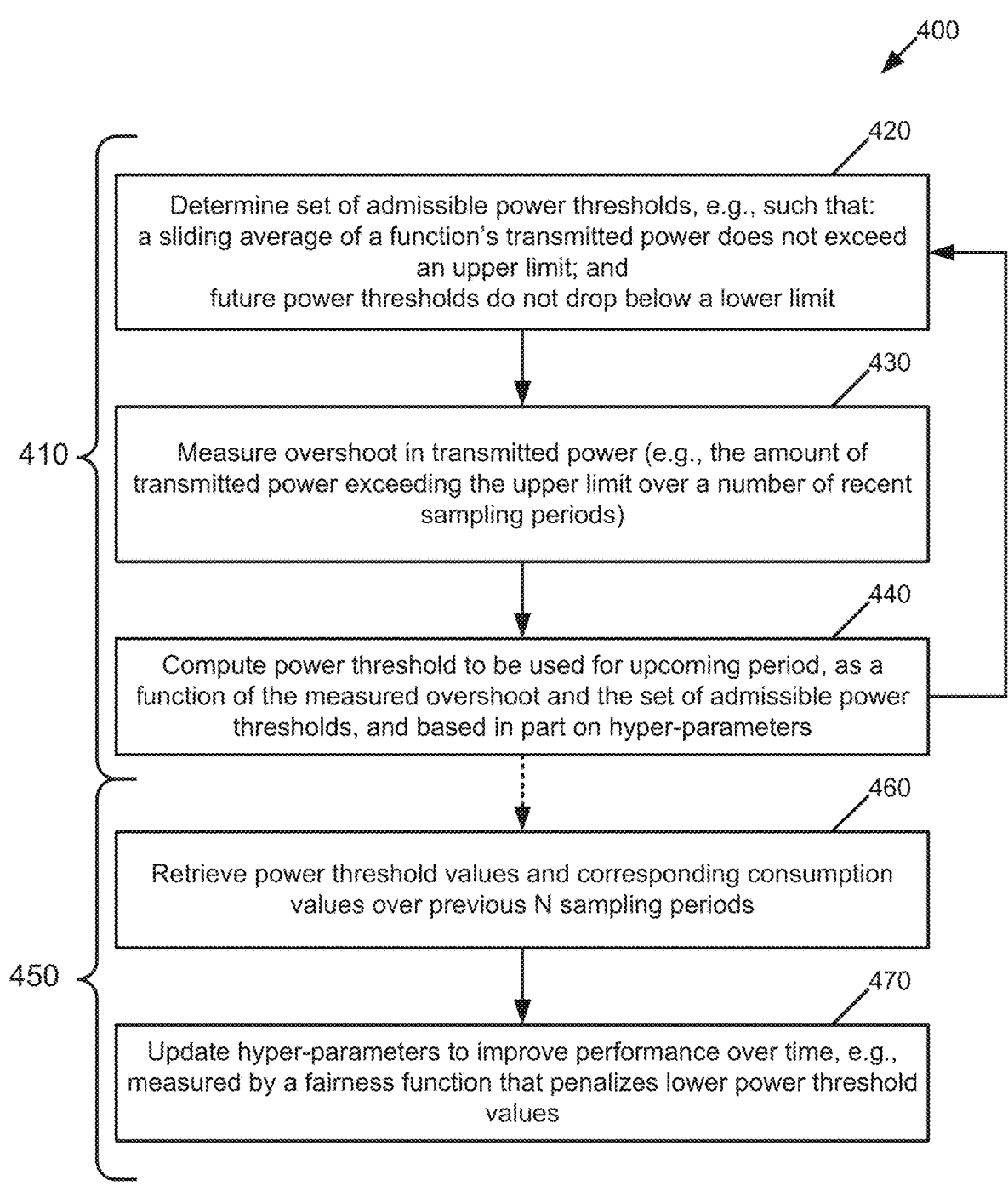
FIG. 3 is a flowchart of a method for computing power thresholds to use and for updating parameters used by the method over time.

First, an overview is provided, then more details are provided. Turning to FIG. 3, this figure is a flowchart of a method 400 for computing power thresholds to use and for updating parameters used by the method over time. FIG. 3 illustrates the operation of an exemplary method, a result of execution of computer program instructions embodied on a computer readable memory, functions performed by logic implemented in hardware, and/or interconnected means for performing functions in accordance with an exemplary embodiment. There are two parts of the method 400, which can be considered to be sub-modules, a fast time scale one 410 and a slow time scale one 450.

The fast time scale part (e.g., module) 410 runs at the BTS. It updates the remaining power budget and optimizes the power threshold at a fast time scale (i.e., every sampling period, e.g., every 100 ms). Meanwhile, the slow time scale part (e.g., module) 450 can be deployed in a non-real time (NRT) device and adjusts (e.g., optimizes) the hyper-parameters of the power threshold optimization algorithm at lower frequency (e.g., every few minutes/hours) to adapt to varying traffic conditions.

The parts 410 and 450 are parts of the method in FIG. 3, but in FIG. 4 these are illustrated as corresponding modules, described below. There are two entities (illustrated in FIG. 4): the base station (e.g., BTS) and a non-real time (NRT) computing node, which may be outside the BTS, else be the BTS itself.

For the fast time scale part, blocks 420, 430, and 440 are performed. At the beginning of sampling period t (e.g., every 100 ms):

1) Computation of admissible thresholds range is performed: The BTS updates the range $\Gamma_t$ of admissible power thresholds $\gamma$, such that:

a) the sliding average of a function's (e.g., the EIRP) transmitted power $c(\gamma)$ does not exceed upper limit $\overline{C}$, as in constraint (2); and b) the future power thresholds $\gamma$ never drop below a lower limit $\rho\overline{C}$, as in equation (3).

This is illustrated in FIG. 3 by block 420: The BTS determines a set of admissible power thresholds, e.g., such that: a sliding average of a function's transmitted power does not exceed an upper limit; and future power thresholds do not drop below a lower limit.

2) A virtual queue update is performed. The BTS updates a virtual queue $Q_t$ measuring the overshoot, i.e., the amount of (the function of) transmitted power exceeding the constraint $\overline{C}$ over the recent sampling periods. This is illustrated by block 430: The BTS measures overshoot in transmitted power (e.g., the amount of transmitted power exceeding the upper limit over a number of recent sampling periods).

3) A power threshold computation is performed. The BTS computes the power threshold $\gamma_t$ for the upcoming period t, as a function $f_\theta(Q_t,\Gamma_t)$ of the virtual queue $Q_t$ and of the set of admissible thresholds $\Gamma_t$, where $f_\theta$ is a) decreasing with respect to the virtual queue $Q_t$; and b) depending on a set of hyper-parameters, called $\theta$.

This is illustrated by block 440: Compute power threshold to be used for upcoming period, as a function of the measured overshoot and the set of admissible power thresholds, and based in part on hyper-parameters.

Blocks 420, 430, and 440 are run during the fast time scale of part 410, and blocks 460 and 470 are performed based on the slow time scale of part 450.

Concerning the slow time scale part 450, every N sampling periods (with N*sampling_period_duration, e.g., sampling_period_duration=100 ms in this example, typically being in the order of few hours, although minutes might be used), the following are performed.

4. Data retrieval is performed: The NRT node retrieves the power threshold values $\gamma_i$ and the corresponding consumption values $c_i(\gamma_i)$ over the last N sampling periods. See block 460: Retrieve power threshold values and corresponding consumption values over previous N sampling periods.

5. A hyper-parameter update is performed. The NRT node updates hyper-parameters $\theta$ (described below) to optimize overall performance, measured via, e.g., a fairness function that penalizes low power threshold values. See block 470: Update hyper-parameters to improve performance over time, e.g., measured by a fairness function that penalizes lower power threshold values As a comparison with legacy techniques, the legacy token bucket techniques described previously do not feature steps 2-3 (nor 4-5, therefore) since a technique there (greedily) computes power threshold $\gamma_t$ as the maximum admissible threshold, i.e., $$\gamma_t = \max_{\gamma \in \Gamma_t} \gamma. \qquad (4)$$

Now that an overview has been provided, more details are provided.

Refer to FIG. 4, this figure illustrates how the method of FIG. 3 may be implemented by modules executed on two devices (or one device). In this example, module 510 corresponds to part 410 of FIG. 3, and module 550 corresponds to part 450 of FIG. 3. Module 510 is performed on a fast time scale and is performed by BTS 170. Module 550 is performed at a slow time scale and is performed by an NRT node 590, which could be a network node 190, although the module 550 may also be performed by the BTS 170. The steps described below are similar to the steps (and corresponding blocks) of FIG. 3, although more details are added.

Step 1. Admissible thresholds. This corresponds to block 420 of FIG. 4 (and FIG. 3). The set of admissible thresholds $\Gamma_t$ may be defined as the interval $\Gamma_t := [\underline{\gamma}_t, \overline{\gamma}_t]$, where, by constraint (2), the lower limit is set to $\underline{\gamma}_t$ $\rho\overline{C}$ and the upper limit $\overline{\gamma}_t$ can be set to the following:

1) the token bucket-based threshold $\gamma_t^{TB}$, as defined in constraint (1); or
2) the power threshold computed via reference [9], which is provably equal to or higher than $\gamma_t^{TB}$ (hence, it allows the BTS to accept more traffic while still fulfilling constraints (1) and (2)).

Step 2. Virtual queue update. This corresponds to block 430 in FIG. 4 (and FIG. 3). At each sampling period t, the BTS updates a so-called virtual queue as follows:

$$Q_0 := 0, \qquad (5)$$

$$Q_{t+1} := \max\left(Q_t + c_t(\gamma_t) - \beta\overline{C}, 0\right), \quad \forall\, t \geq 0, \qquad (6)$$

where $0 < \gamma \leq 1$ is a hyper-parameter. It should be noted based on (5) that if $c_t(\gamma_t) \leq \beta\overline{C}$ for several t's then the virtual queue empties, hence the past overshoot is no longer visible from Q.

Intuitively, the virtual queue $Q_t$ measures the excess of recent power consumption values $c(\gamma)$ with respect to the limit $\overline{C}$. Intuitively, the virtual queue "warns" the BTS when traffic has been recently high, and the constraint (2) may be hit soon.

The following technical remark is noted. The limit $\overline{C}$ is artificially reduced by a factor $\beta$. This serves a useful purpose under high traffic situations, where the optimal threshold is $\gamma_t=\overline{C}$, hence $c_t(\gamma_t)=\overline{C}$. In such a scenario, if $\beta=1$ then $Q_t=0$ for all t, which does not reflect the fact that traffic is actually high. Hence, setting $\beta<1$ allows the BTS to better assess situations with constantly high traffic.

Step 3. Power threshold computation. This corresponds to block 440 in FIGS. 5 and 4. Once the virtual queue is updated, the BTS computes the power threshold $\gamma_t$ to be deployed over sampling period t as:

$$\gamma_t = f_\theta(Q_t, \Gamma_t) \in \Gamma_t, \qquad (6)$$

where $f_\theta(Q_t, \Gamma_t)$ is a function decreasing in the virtual queue value $Q_t$ and increasing in the highest admissible threshold $\overline{\gamma}_t$.

Intuitively, the higher $Q_t$, the higher the traffic during the last periods; hence, the lower the threshold should be, in order to preemptively smooth out consumption and avoid any resource shortage in the next sampling periods.

An exemplary implementation is as follows. To instantiate the function $f_\theta$, one may resort to a Lyapunov optimization technique called Drift-Plus-Penalty (DPP) addressing problems of the kind:

$$\max \lim_{T \to \infty} \frac{1}{T} \sum_{t=0}^{T-1} h(\gamma_t) \qquad (7)$$

$$\text{s.t.} \quad \lim_{T \to \infty} \frac{1}{T} \sum_{t=0}^{T-1} c_t(\gamma_t) \leq \overline{C},$$

where in this case $h(\bullet)$ is a fairness function, increasing in $\gamma$ and overly penalizing small values of power thresholds $\gamma$ to ensure a smooth behavior of $\gamma$ over time. As one example, the fairness function can be defined as a concave increasing function, and suitable small values may be determined and penalized. That is, it is possible to penalize values of power thresholds $\gamma$ that meet one or more criteria to ensure a behavior of $\gamma$ over time that is smoother than without the penalizing.

A possible choice for $h(\bullet)$ is the so called $\alpha$-fairness:

$$h(\gamma) = \begin{cases} \log(\gamma) & \text{if } \alpha = 1 \\ \dfrac{\gamma^{1-\alpha}}{1-\alpha} & \text{if } \alpha \geq 0,\, \alpha \neq 1 \end{cases}.$$

DPP prescribes to compute the optimal threshold $\gamma_t^*$ as the one minimizing a linear combination of the kind:

$$\gamma_t^* = \arg\min_\gamma Q_t c_t(\gamma) - V h(\gamma),$$

where $V > 0$ is a hyper-parameter.

However, in this case, there are the following issues:
a) $c_t(\gamma)$ is not known to the BTS at the beginning of the sampling period t, but rather only at its end; and
b) constraint (7) is over an infinite time window, while in the original problem, the power constraint (2) is on a sliding (finite) window.

To address issue (a), one can exploit the relation $c_t(\gamma) \leq \gamma$ and upper bound $Q_t c_t(\gamma) - V h(\gamma)$ by $Q_t \gamma - V h(\gamma)$.

Regarding issue (b), one can simply constrain $\gamma_t$ within the admissible range $\Gamma_t$ and compute the threshold $\gamma_t$ as:

$$\gamma_t = \arg\min_{\gamma \in \Gamma_T} Q_t \gamma - V h(\gamma), \qquad (8)$$

$$= \max\left(\min\left(V/Q_t^{1/\alpha}, \overline{\gamma}_t\right), \rho\overline{C}\right),$$

where (8) is computed by setting to 0 (zero) the derivative of $Q_t \gamma - V h(\gamma)$ with respect to $\gamma$ and then projecting to the admissible interval $[\rho\overline{C}, \overline{\gamma}_t]$.

It is remarked that $\gamma_t$ computed as in (8) is indeed decreasing with respect to the virtual queue length $Q_t$, and $\gamma_t$ always belongs to $\Gamma_t$.

Finally, in this case, the hyper-parameters $\theta$ are defined as $\theta = [\beta, V, \rho]$, where $\theta < \beta < 1$, $V > 0$, $0 \leq \rho \leq 1$.

It is remarked that, although ρ appears in the constraint of the problem that is solved above ($\gamma_t \geq \rho \overline{C}$, $\forall t \geq 0$), its value is often not mandated by, say, a customer, and ρ can be rather considered as a hyper-parameter of the DPP algorithm.

Block 555 illustrates that there is an evaluation of power consumption, $c_t(\gamma_t)$, that is performed. Power consumption evaluation should occur at the end of each sampling period.

Reference 561 indicates the sampling period t is increased (++), and the flow proceeds from block 555 to block 420.

Step 5. This involves a hyper-parameter θ update. See block 470 in FIG. 4 (and FIG. 3). Upon retrieving historical data on threshold and power consumption in step 4 (data retrieval, block 460 in FIGS. 4 and 5) over a batch of sampling periods, the non-real-time (NRT) computation node updates the hyper-parameters θ.

One may recall that θ defines the function $f_\theta$ used in step 3 to compute the power thresholds in each sampling period. One may also be reminded that the NRT node is either external to the BTS (as a network node 190) or contained in the BTS itself. The following operations are described in part through reference to FIG. 4A, which is a flowchart of updating hyper-parameters and is performed by an NRT node. FIG. 4A illustrates the operation of an exemplary method, a result of execution of computer program instructions embodied on a computer readable memory, functions performed by logic implemented in hardware, and/or interconnected means for performing functions in accordance with an exemplary embodiment.

The goal (see block 580 of FIG. 4) is to find the hyper-parameter vector value θ maximizing the expected performance in terms of power threshold fairness h as defined in step 3, i.e., $$\theta^* = \arg\max_\theta \mathbb{E}[h(\gamma)] = \mathbb{E}[h(f_\theta(Q, \Gamma))] := H(\theta). \qquad (9)$$

The NRT node can estimate the value of the performance H(θ) in correspondence of the hyper-parameters $\theta_i$ used in period batch i=0, 1, . . . , (see block 581) as:

$$H(\theta_i) \approx \frac{1}{|\tau_i|} \sum_{t \in \tau_i} h(\gamma_t),$$

where $\tau_i$ is the set of periods within batch i, and $|\tau_i|$ is its number.

To find (see block 583) the optimal θ* as in (9), at batch i, the NRT node has stored the previous choices $\theta_0$, $\theta_1$, . . . , $\theta_{i-1}$ and the corresponding performance H($\theta_0$), H($\theta_1$), . . . , H($\theta_{i-1}$).

Then, to choose the next value $\theta_i$ (else, terminate the search and settle on a fixed value θ≈θ*), the NRT node can use (block 583) a state-of-the-art black-box optimization technique, allowing one to optimize a function by just sampling it at selected points, such as in reference [10] (Kolda et al., "Optimization by direct search: New perspectives on some classical and modern methods", SIAM review, 2003), where these can be chosen:

Nelder-Mead; or
DIRECT (DIviding RECTangles).

There are a number of practical implementations for the NRT. For instance, the NRT computation can be performed either in an Edge Cloud (hence, in the CU) or in AirScale System Module (hence, in a DU). Other options are also possible.

Figures 5A, 5B:
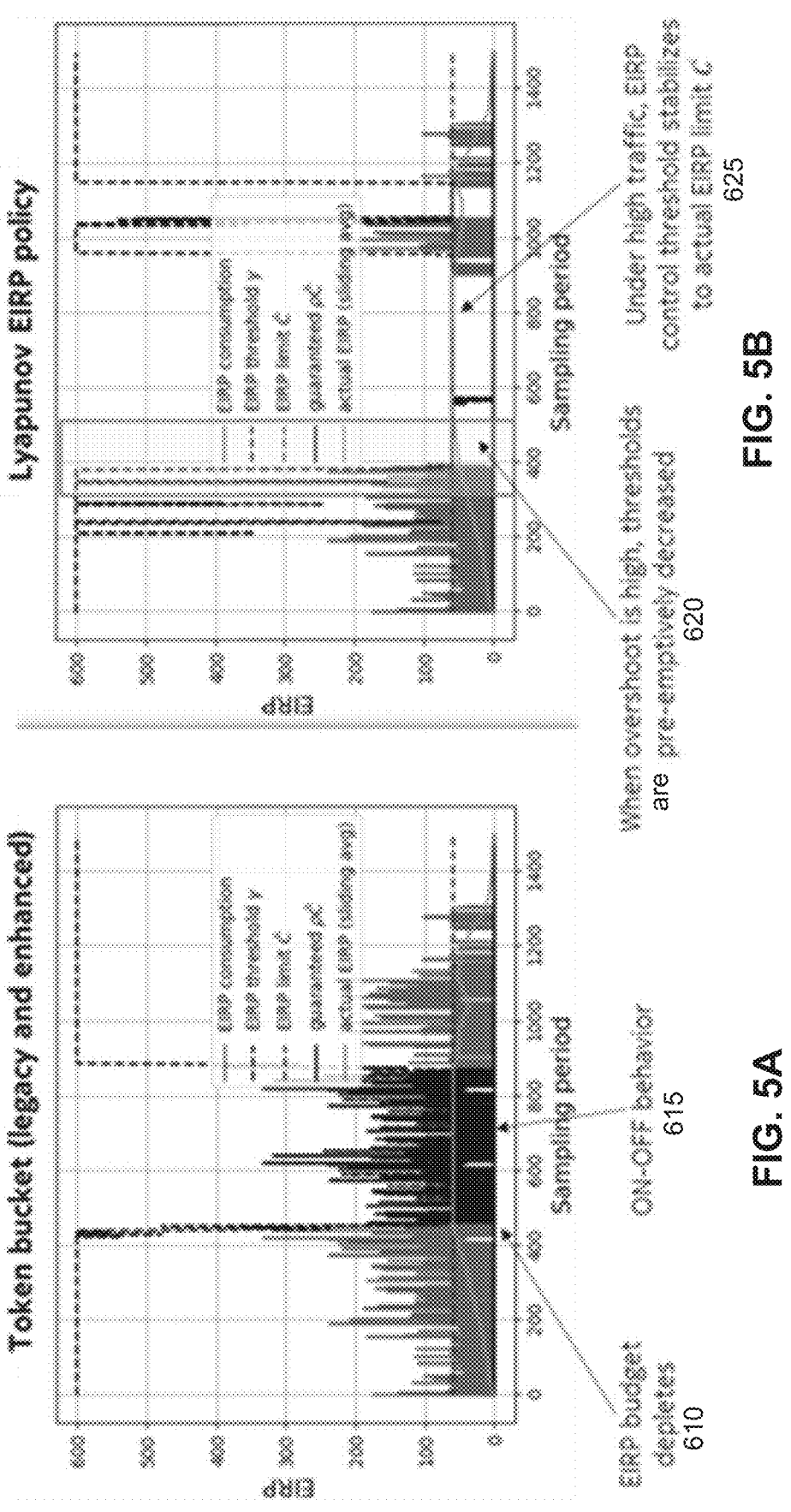
FIGS. 5A and 5B are graphs illustrating Lyapunov-based power (EIRP) threshold policy (FIG. 5B) versus legacy token bucket greedy policy (FIG. 5A)

FIGS. 5A and 5B are graphs illustrating Lyapunov-based power (EIRP) threshold policy (FIG. 5B) versus legacy token bucket greedy policy (FIG. 5A). These are used to illustrate numerical evaluations of the techniques presented herein as compared to legacy techniques. In particular, and exemplary Lyapunov-based traffic smoothing technique described herein (FIG. 5B) was comparted against a legacy token bucket solution [5,6](FIG. 5A) on a simulated model of the 5G2300 feature. To emulate the 5G2300 inner loop (i.e., the EIRP control within a single sampling period), a classic proportional fairness scheduler was used that allocates users for transmission until the available resources within a period are depleted. If a packet is not transmitted in a sampling period, then it is buffered and transmitted at successive periods.

When the traffic increases (sampling periods 0-400+), see FIG. 5B, the virtual queue of the techniques herein starts filling and the techniques start decreasing the power thresholds in pre-emptive fashion (period ~400) and it stabilizes around the limit γ=$\overline{C}$, hence providing stable service to the network. See reference 620, which indicates that when the overshoot is high, the thresholds are preemptively decreased. Reference 625 indicates that, under high traffic, EIRP control threshold stabilizes to the actual EIRP limit $\overline{C}$.

On the other hand, legacy token bucket (see FIG. 5A) starts decreasing the power threshold only later on (period 400+), only once the remaining power budget is depleted. See reference 610, where it is seen that the EIRP budge depletes near sampling period 450. This is due to its inherent greedy nature, that always lets the traffic be served until budget depletion. This causes a hectic ON-OFF behavior of the power threshold later on (periods ~450-850), where ON-OFF behavior 615 is performed, which degrades user experience in terms of high traffic jitter and low delay fairness across users. In fact, users attempting to connect over OFF periods incur non-negligible delay.

Figure 6:
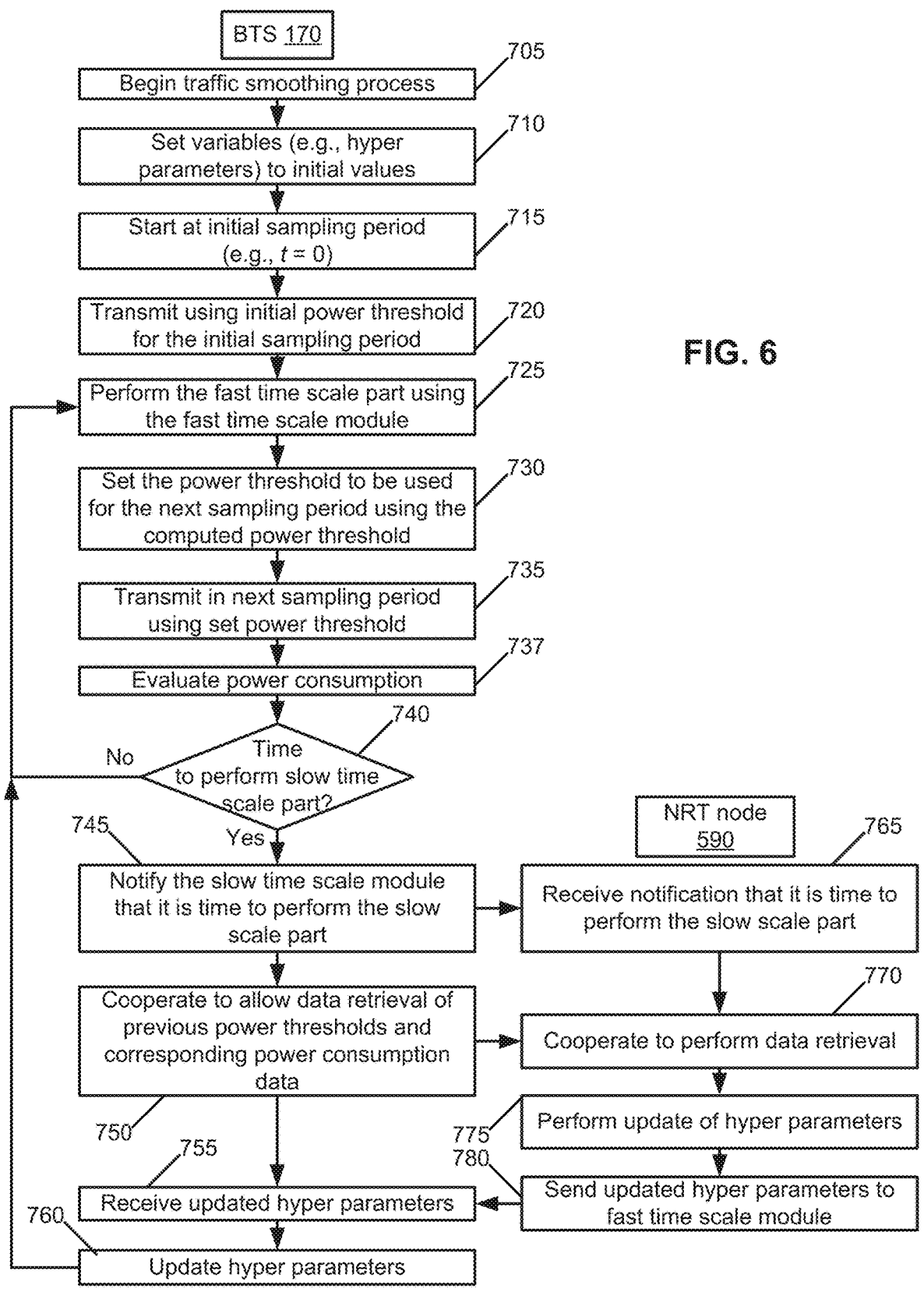
FIG. 6 is flowchart of a method for traffic smoothing.

Turning to FIG. 6, this figure is flowchart of a method for traffic smoothing. FIG. 3 illustrates the operation of an exemplary method, a result of execution of computer program instructions embodied on a computer readable memory, functions performed by logic implemented in hardware, and/or interconnected means for performing functions in accordance with an exemplary embodiment. Blocks 705-760 are performed by a BTS 170 and blocks 765-780 are performed by an NRT node 580, which could be a network node 190 or the BTS 170.

In block 705, the BTS 170 starts the traffic smoothing process. The BTS 170 sets variables (e.g., for the hyper-parameters) to initial values in block 710. For the hyper-parameters as one example, one initially sets them to a reasonable value and then updates them afterwards with the specified procedure. For block 715, the BTS 170 starts at an initial sampling period (e.g., t=0). The BTS 170 transmits in block 720 using an initial power threshold for the initial sampling period.

In block 725, the BTS 170 performs the fast time scale part 410 using the fast time scale module 510. The BTS 170, in block 730, sets the power threshold to be used for the next sampling period using the computed power threshold from the first time scale part 410. The BTS 170 transmits in the next sampling period using the set power threshold. See block 735. In block 737, the BTS 170 evaluates power consumption for the current sampling period.

In block 740, the BTS 170 determines whether it is time to perform the slow time scale part 420. This could be performed by comparing the number of sampling periods to N, which could have been set in block 710. Many other options are possible, such as setting a time period (in step 410) and determining whether the number of sampling periods is equivalent to or larger than the time periods. If it is not the time (block 740=No), the flow proceeds to block 725.

If it is the time (block 740=Yes), in block 745, the BTS 170 notifies the slow time scale module 550 (e.g., by contacting the NRT node 590) that it is time to perform the slow scale part 420. The NRT node 590 receives the notification in block 765, and then both the BTS 170 and the NRT node 590 cooperate so the gNB allows (block 750) data retrieval of previous power thresholds and corresponding power consumption data, and the NRT node 590 causes the slow time scale part 420 to be performed and performs (block 770) the data retrieval (as also in reference 460 of FIGS. 4 and 5).

The NRT node 590 causes the slow time scale module 550 to perform the update of the hyper-parameters in block 775. The NRT node 590 sends (block 780) the updated hyper-parameters to the fast time scale module 550.

The BTS 170 and its fast time scale module 510 receives the updated hyper-parameters in block 755, and updates the hyper-parameters in block 760. The flow proceeds to block 725.

Without in any way limiting the scope, interpretation, or application of the claims appearing below, a technical effect and advantage of one or more of the example embodiments disclosed herein is that it reduces the occurrence of power budget depletion, which leads to seamless connectivity, low traffic jitter, and high user delay fairness at any time.

The following are additional examples.

Example 1. A method, comprising:

determining by a base station a power threshold to use for transmission in a sampling period in order to meet a power requirement defined to limit an amount of a function of radiated power, comprising:

determining a set of admissible power thresholds;

measuring overshoot in transmitted power; and computing the power threshold to be used for the transmission, as a function of the measured overshoot and the set of admissible power thresholds, to form the determined power threshold;

performing by the base station the transmission in the sampling period using the determined power threshold.

Example 2. The method according to example 1, wherein the determining the power threshold to use for transmission in the sampling period is performed in a first time scale and wherein the method further comprises performing the following in a second time scale:

storing multiple power thresholds used by the base station for transmission over multiple time periods and storing corresponding multiple power consumption values over those multiple time periods;

sending, by the base station to a network node, the multiple power thresholds and corresponding multiple power consumption values;

receiving, by the base station from the network node, a set of hyper-parameters for determination of power thresholds for transmission; and using by the base station the set of hyper-parameters when determining the power threshold to use for transmission in the sampling period.

Example 3. The method according to example 1, wherein the determining the power threshold to use for transmission in the sampling period is performed in a first time scale and wherein the method further comprises performing the following in a second time scale:

storing multiple power thresholds used by the base station for transmission over multiple time periods and storing corresponding multiple power consumption values over those multiple time periods;

finding a set of hyper-parameters that improve expected performance in terms of power threshold fairness using the multiple power threshold and multiple power consumption values; and using by the base station the set of hyper-parameters when determining the power threshold to use for transmission in the sampling period.

Example 4. The method according to any one of examples 2 or 3, further comprising the base station determining a value for power consumption corresponding to the performed transmission, wherein the determining the power threshold to use, performing the transmission, and determining the value are performed in order to perform the storing multiple power thresholds.

Example 5. The method according to any one of examples 2 to 4, wherein determining the set of admissible power thresholds comprises:

in response to a beginning of the sampling period, updating a range of admissible power thresholds, such that:

a sliding average of a function's transmitted power does not exceed an upper limit; and future power thresholds never drop below a lower limit, wherein the updated range of admissible power thresholds is the set of admission power thresholds.

Example 6. The method according to example 5, wherein measuring overshoot in transmitted power comprises updating a virtual queue measuring an amount of a function of transmitted power exceeding a constraint over a number of recent sampling periods, the amount being the overshoot.

Example 7. The method according to example 6, wherein computing the power threshold to be used for the transmission comprises computing the power threshold $\gamma_t$ for an upcoming period t, as a function $f_\theta(Q_t,\Gamma_t)$ of the virtual queue $Q_t$ and of the set of admissible thresholds $\Gamma_t$, where $f_\theta$ is a) decreasing with respect to the virtual queue $Q_t$; and b) depending on a set of hyper-parameters, $\theta$.

Example 8. The method according to example 7, wherein function $f_\theta$ is instantiated using the following Lyapunov optimization technique:

$$\max_{T\to\infty} \lim \frac{1}{T}\sum\nolimits_{t=0}^{T-1} h(\gamma_t),$$

$$\text{s.t.} \lim_{T\to\infty} \frac{1}{T}\sum\nolimits_{t=0}^{T-1} c_t(\gamma_t) \le \bar{C},$$

where $h(\cdot)$ is a fairness function, increasing in $\gamma$ and penalizing values of power thresholds $\gamma$ that meet one or more criteria to ensure a behavior of $\gamma$ over time that is smoother than without the penalizing, $c_t$ is a power consumption function within sampling period t=0, 1, . . . , $\gamma_t$ is a power threshold that is controlled for sampling period t.

Example 9. The method according to either example 7 or 8, wherein the set of hyper-parameters are $\theta=[\beta, V, \rho]$, having values $0<\beta<1$, $V>0$, $0\le\rho\le1$, where $\beta$ is used in determination of the virtual queue $Q_t$, V is used to determine the function $f_\theta(Q_t,\Gamma_t)$, and $\rho$ is used to calculate the lower limit over which future power thresholds never drop below.

Example 10. The method according to any one of examples 1 to 9, wherein the function of the radiated power is equivalent isotropic radiated power, and the power thresholds are expressed as equivalent isotropic radiated power.

Example 11. The method according to any one of examples 1 to 10, wherein the determined power threshold is used to determine one of the following for the transmission:

a number of sub-carriers to use to serve users;

a power of a beam allocated to a specific user and at a specific slot;

a gain of a beam used by each user in each slot; or how to control jointly a number of carriers, beam power, and beam gain.

Example 12. A method, comprising:

receiving multiple power thresholds used by a base station for transmission over multiple time periods and corresponding multiple power consumption values over those multiple time periods;

finding a set of hyper-parameters that improve expected performance in terms of power threshold fairness using the multiple power thresholds and multiple power consumption values; and sending the set of hyper-parameters to the base station for use by the base station for determination of power thresholds for transmission.

Example 13. The method according to example 12, wherein finding the set of hyper-parameters further comprises:

estimating a value of performance $H(\theta)$, which is based on fairness, in correspondence of the hyper-parameters used in multiple batches of sampling periods.

Example 14. The method according to example 13, wherein finding the set of hyper-parameters further comprises finding a set of hyper-parameters $(\theta)$ at a batch i of the multiple batches of sampling periods, retrieving previously stored choices of sets of hyper-parameters and corresponding performances, and using a technique allowing optimization of a function by sampling the function at selected points.

Example 15. A computer program, comprising instructions for performing the methods of any of examples 1 to 11, when the computer program is run on an apparatus.

Example 16. The computer program according to example 15, wherein the computer program is a computer program product comprising a computer-readable medium bearing instructions embodied therein for use with the apparatus.

Example 17. The computer program according to example 15, wherein the computer program is directly loadable into an internal memory of the apparatus.

Example 18. An apparatus, comprising means for performing:

determining by a base station a power threshold to use for transmission in a sampling period in order to meet a power requirement defined to limit an amount of a function of radiated power, comprising:

determining a set of admissible power thresholds;

measuring overshoot in transmitted power; and computing the power threshold to be used for the transmission, as a function of the measured overshoot and the set of admissible power thresholds, to form the determined power threshold;

performing by the base station the transmission in the sampling period using the determined power threshold.

Example 19. The apparatus according to example 18, wherein the determining the power threshold to use for transmission in the sampling period is performed in a first time scale and wherein the means are further configured for performing the following in a second time scale:

storing multiple power thresholds used by the base station for transmission over multiple time periods and storing corresponding multiple power consumption values over those multiple time periods;

sending, by the base station to a network node, the multiple power thresholds and corresponding multiple power consumption values;

receiving, by the base station from the network node, a set of hyper-parameters for determination of power thresholds for transmission; and using by the base station the set of hyper-parameters when determining the power threshold to use for transmission in the sampling period.

Example 20. The apparatus according to example 18, wherein the determining the power threshold to use for transmission in the sampling period is performed in a first time scale and wherein the means are further configured for performing the following in a second time scale:

storing multiple power thresholds used by the base station for transmission over multiple time periods and storing corresponding multiple power consumption values over those multiple time periods;

finding a set of hyper-parameters that improve expected performance in terms of power threshold fairness using the multiple power threshold and multiple power consumption values; and using by the base station the set of hyper-parameters when determining the power threshold to use for transmission in the sampling period.

Example 21. The apparatus according to any one of examples 19 or 20, wherein the means are further configured for performing: the base station determining a value for power consumption corresponding to the performed transmission, wherein the determining the power threshold to use, performing the transmission, and determining the value are performed in order to perform the storing multiple power thresholds.

Example 22. The apparatus according to any one of examples 19 to 21, wherein determining the set of admissible power thresholds comprises:

in response to a beginning of the sampling period, updating a range of admissible power thresholds, such that:

a sliding average of a function's transmitted power does not exceed an upper limit; and future power thresholds never drop below a lower limit, wherein the updated range of admissible power thresholds is the set of admission power thresholds.

Example 23. The apparatus according to example 22, wherein measuring overshoot in transmitted power comprises updating a virtual queue measuring an amount of a function of transmitted power exceeding a constraint over a number of recent sampling periods, the amount being the overshoot.

Example 24. The apparatus according to example 23, wherein computing the power threshold to be used for the transmission comprises computing the power threshold $\gamma_t$ for an upcoming period t, as a function $f_\theta(Q_t, \Gamma_t)$ of the virtual queue $Q_t$ and of the set of admissible thresholds $\Gamma_t$, where $f_\theta$ is a) decreasing with respect to the virtual queue $Q_t$; and b) depending on a set of hyper-parameters, $\theta$.

Example 25. The apparatus according to example 24, wherein function $f_\theta$ is instantiated using the following Lyapunov optimization technique:

$$\max \lim_{T \to \infty} \frac{1}{T} \sum_{t=0}^{T-1} h(\gamma_t),$$

$$\text{s.t.} \quad \lim_{T \to \infty} \frac{1}{T} \sum_{t=0}^{T-1} c_t(\gamma_t) \leq \bar{C},$$

where $h(\cdot)$ is a fairness function, increasing in $\gamma$ and penalizing values of power thresholds $\gamma$ that meet one or more criteria to ensure a behavior of $\gamma$ over time that is smoother than without the penalizing, $c_t$ is a power consumption function within sampling period $t=0$, $1, \ldots, \gamma_t$ is a power threshold that is controlled for sampling period t.

Example 26. The apparatus according to either example 24 or 25, wherein the set of hyper-parameters are $\theta=[\beta, V, \rho]$, having values $0<\beta<1$, $V>0$, $0\leq\rho\leq1$, where $\beta$ is used in determination of the virtual queue $Q_t$, V is used to determine the function $f_\theta(Q_t, \Gamma_t)$, and $\rho$ is used to calculate the lower limit over which future power thresholds never drop below.

Example 27. The apparatus according to any one of examples 18 to 26, wherein the function of the radiated power is equivalent isotropic radiated power, and the power thresholds are expressed as equivalent isotropic radiated power.

Example 28. The apparatus according to any one of examples 18 to 27, wherein the determined power threshold is used to determine one of the following for the transmission:

a number of sub-carriers to use to serve users;

a power of a beam allocated to a specific user and at a specific slot;

a gain of a beam used by each user in each slot; or how to control jointly a number of carriers, beam power, and beam gain.

Example 29. An apparatus, comprising means for performing:

receiving multiple power thresholds used by a base station for transmission over multiple time periods and corresponding multiple power consumption values over those multiple time periods;

finding a set of hyper-parameters that improve expected performance in terms of power threshold fairness using the multiple power thresholds and multiple power consumption values; and sending the set of hyper-parameters to the base station for use by the base station for determination of power thresholds for transmission.

Example 30. The apparatus according to example 29, wherein finding the set of hyper-parameters further comprises:

estimating a value of performance H(θ), which is based on fairness, in correspondence of the hyper-parameters used in multiple batches of sampling periods.

Example 31. The apparatus according to example 30, wherein finding the set of hyper-parameters further comprises finding a set of hyper-parameters (θ) at a batch i of the multiple batches of sampling periods, retrieving previously stored choices of sets of hyper-parameters and corresponding performances, and using a technique allowing optimization of a function by sampling the function at selected points.

Example 32. An apparatus, comprising:

one or more processors; and one or more memories storing instructions that, when executed by the one or more processors, cause the apparatus at least to perform:

determining by a base station a power threshold to use for transmission in a sampling period in order to meet a power requirement defined to limit an amount of a function of radiated power, comprising:

determining a set of admissible power thresholds;

measuring overshoot in transmitted power; and computing the power threshold to be used for the transmission, as a function of the measured overshoot and the set of admissible power thresholds, to form the determined power threshold;

performing by the base station the transmission in the sampling period using the determined power threshold.

Example 33. The apparatus according to example 32, wherein the determining the power threshold to use for transmission in the sampling period is performed in a first time scale and wherein the one or more memories further store instructions that, when executed by the one or more processors, cause the apparatus at least to perform the following in a second time scale:

storing multiple power thresholds used by the base station for transmission over multiple time periods and storing corresponding multiple power consumption values over those multiple time periods;

sending, by the base station to a network node, the multiple power thresholds and corresponding multiple power consumption values;

receiving, by the base station from the network node, a set of hyper-parameters for determination of power thresholds for transmission; and using by the base station the set of hyper-parameters when determining the power threshold to use for transmission in the sampling period.

Example 34. The apparatus according to example 32, wherein the determining the power threshold to use for transmission in the sampling period is performed in a first time scale and wherein the one or more memories further store instructions that, when executed by the one or more processors, cause the apparatus at least to perform the following in a second time scale:

storing multiple power thresholds used by the base station for transmission over multiple time periods and storing corresponding multiple power consumption values over those multiple time periods;

finding a set of hyper-parameters that improve expected performance in terms of power threshold fairness using the multiple power threshold and multiple power consumption values; and using by the base station the set of hyper-parameters when determining the power threshold to use for transmission in the sampling period.

Example 35. The apparatus according to any one of examples 33 or 34, wherein the one or more memories further store instructions that, when executed by the one or more processors, cause the apparatus at least to perform: the base station determining a value for power consumption corresponding to the performed transmission, wherein the determining the power threshold to use, performing the transmission, and determining the value are performed in order to perform the storing multiple power thresholds.

Example 36. The apparatus according to any one of examples 33 to 35, wherein determining the set of admissible power thresholds comprises:

in response to a beginning of the sampling period, updating a range of admissible power thresholds, such that:

a sliding average of a function's transmitted power does not exceed an upper limit; and future power thresholds never drop below a lower limit, wherein the updated range of admissible power thresholds is the set of admission power thresholds.

Example 37. The apparatus according to example 36, wherein measuring overshoot in transmitted power comprises updating a virtual queue measuring an amount of a function of transmitted power exceeding a constraint over a number of recent sampling periods, the amount being the overshoot.

Example 38. The apparatus according to example 37, wherein computing the power threshold to be used for the transmission comprises computing the power threshold $\gamma_t$ for an upcoming period t, as a function $f_\theta(Q_t, \Gamma_t)$ of the virtual queue $Q_t$ and of the set of admissible thresholds $\Gamma_t$, where $f_\theta$ is a) decreasing with respect to the virtual queue $Q_t$; and
b) depending on a set of hyper-parameters, $\theta$.

Example 39. The apparatus according to example 38, wherein function $f_{\theta\theta}$ is instantiated using the following Lyapunov optimization technique:

$$\max \quad \lim_{T\to\infty} \frac{1}{T}\sum_{t=0}^{T-1} h(\gamma_t),$$

$$\text{s.t.} \quad \lim_{T\to\infty} \frac{1}{T}\sum_{t=0}^{T-1} c_t(\gamma_t) \le \bar{C},$$

where $h(\cdot)$ is a fairness function, increasing in $\gamma$ and penalizing values of power thresholds $\gamma$ that meet one or more criteria to ensure a behavior of $\gamma$ over time that is smoother than without the penalizing, $c_t$ is a power consumption function within sampling period t=0, 1, . . . , $\gamma_t$ is a power threshold that is controlled for sampling period t.

Example 40. The apparatus according to either example 38 or 39, wherein the set of hyper-parameters are $\theta=[\beta, V, \rho]$, having values $0<\beta<1$, $V>0$, $0\le\rho\le1$, where $\beta$ is used in determination of the virtual queue $Q_t$, V is used to determine the function $f_\theta(Q_t, \Gamma_t)$, and $\rho$ is used to calculate the lower limit over which future power thresholds never drop below.

Example 41. The apparatus according to any one of examples 32 to 40, wherein the function of the radiated power is equivalent isotropic radiated power, and the power thresholds are expressed as equivalent isotropic radiated power.

Example 42. The apparatus according to any one of examples 32 to 41, wherein the determined power threshold is used to determine one of the following for the transmission:

a number of sub-carriers to use to serve users;
a power of a beam allocated to a specific user and at a specific slot;
a gain of a beam used by each user in each slot; or
how to control jointly a number of carriers, beam power, and beam gain.

Example 43. An apparatus, comprising:
one or more processors; and
one or more memories storing instructions that, when executed by the one or more processors, cause the apparatus at least to perform:

receiving multiple power thresholds used by a base station for transmission over multiple time periods and corresponding multiple power consumption values over those multiple time periods;

finding a set of hyper-parameters that improve expected performance in terms of power threshold fairness using the multiple power thresholds and multiple power consumption values; and sending the set of hyper-parameters to the base station for use by the base station for determination of power thresholds for transmission.

Example 44. The apparatus according to example 43, wherein finding the set of hyper-parameters further comprises:

estimating a value of performance H($\theta$), which is based on fairness, in correspondence of the hyper-parameters used in multiple batches of sampling periods.

Example 45. The apparatus according to example 44, wherein finding the set of hyper-parameters further comprises finding a set of hyper-parameters ($\theta$) at a batch i of the multiple batches of sampling periods, retrieving previously stored choices of sets of hyper-parameters and corresponding performances, and using a technique allowing optimization of a function by sampling the function at selected points.

As used in this application, the term "circuitry" may refer to one or more or all of the following:

(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals. The term "non-transitory", as used herein, is a limitation of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AMF access and mobility management function
BTS base transceiver station, e.g., a gNB
CU central unit
DPP Drift-Plus-Penalty
DU distributed unit
EIRP equivalent isotropic radiated power
EMF electromagnetic field
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplexing
FR1 frequency range 1
FR2 frequency range 2
GBR Guaranteed Bit Rate
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
ng or NG next generation
ng-eNB or NG-eNB next generation eNB
NON-RT (or NRT) Non-real-time
NR new radio
N/W or NW network
OFDM orthogonal frequency division multiplexed
PDCP packet data convergence protocol
PHY physical layer
PRB physical resource block
QCI QoS Class Identifier
QoS quality of service
RAN radio access network
RE Resource Element
Rel release
RF radio frequency RIC Radio Intelligent Controller
RLC radio link control
RRH remote radio head
RRC radio resource control
RU radio unit
Rx receiver
SDAP service data adaptation protocol
SGW serving gateway
SMF session management function
TB Token Bucket
TDD time division duplexing
TS technical specification
Tx transmitter
UE user equipment (e.g., a wireless, typically mobile device)
UPF user plane function

CITED REFERENCES

[1] IEC 62232:2017, "Determination of RF field strength, power density and SAR in the vicinity of radiocommunication base stations for the purpose of evaluating human exposure", August 2017.
[2] IEC TR 62669:2019, "Case studies supporting IEC 62232—Determination of RF field strength, power density and SAR in the vicinity of radiocommunication base stations for the purpose of evaluating human exposure", April 2019.
[3] IEC 62232 ED3 CDV (106/550/CDV), "Determination of RF field strength, power density and SAR in the vicinity of radiocommunication base stations for the purpose of evaluating human exposure", July 2021.
[4] ICNIRP-2020, International Commission on Non-Ionizing Radiation Protection (ICNIRP), "Guidelines for limiting exposure to electromagnetic fields (100 kHz to 300 GHz)", Health Physics, 118(5):483-524; 2020.
[5] EP2019/071104, WO 2021/023375, "Method for controlling radio frequency emissions".
[6] Christer Tornevik et al. "Time Averaged Power Control of a 4G or a 5G Radio Base Station for RF EMF Compliance", IEEE Access, December 2020.
[7] M. R. Castellanos, D. J. Love, and B. M. Hochwald, "Hybrid precoding for millimeter wave systems with a constraint on user electromagnetic radiation exposure," in 2016 50th Asilomar Conference on Signals, Systems and Computers. IEEE, 2016, pp. 296-300.
[8] I. Nasim and S. Kim, "Mitigation of human EMF exposure in a cellular wireless system," in 2020 IEEE 92nd Vehicular Technology Conference (VTC2020-Fall). IEEE, 2020, pp. 1-5.
[9] NC326879, "MAXIMUM RADIO EMISSION UNDER SLIDING AVERAGE UPPER LIMIT AND TRAFFIC GUARANTEES LOWER LIMIT"
[10] Kolda et al., "Optimization by direct search: New perspectives on some classical and modern methods", SIAM review, 2003.

What is claimed is:
1. A method comprising:
determining by a base station a power threshold to use for transmission in a sampling period in order to meet a power requirement defined to limit an amount of a function of radiated power, comprising:
determining a set of admissible power thresholds;
measuring overshoot in transmitted power; and
computing the power threshold to be used for the transmission, as a function of the measured over- shoot and the set of admissible power thresholds, to form the determined power threshold;

performing by the base station the transmission in the sampling period using the determined power threshold.

2. The method according to claim 1, further comprising: determining by a base station a power threshold to use for transmission in a sampling period in order to meet a power requirement defined to limit an amount of a function of radiated power, comprising:

determining a set of admissible power thresholds;

measuring overshoot in transmitted power; and computing the power threshold to be used for the transmission, as a function of the measured overshoot and the set of admissible power thresholds, to form the determined power threshold; and performing by the base station the transmission in the sampling period using the determined power threshold.

3. The method according to claim 2, wherein the determining the power threshold to use for transmission in the sampling period is performed in a first time scale and wherein the method further comprises performing the following in a second time scale:

storing multiple power thresholds used by the base station for transmission over multiple time periods and storing corresponding multiple power consumption values over those multiple time periods;

sending, by the base station to a network node, the multiple power thresholds and corresponding multiple power consumption values;

receiving, by the base station from the network node, a set of hyper-parameters for determination of power thresholds for transmission; and using by the base station the set of hyper-parameters when determining the power threshold to use for transmission in the sampling period.

4. The method according to claim 2, wherein the determining the power threshold to use for transmission in the sampling period is performed in a first time scale and wherein the method further comprises performing the following in a second time scale:

storing multiple power thresholds used by the base station for transmission over multiple time periods and storing corresponding multiple power consumption values over those multiple time periods;

finding a set of hyper-parameters that improve expected performance in terms of power threshold fairness using the multiple power threshold and multiple power consumption values; and using by the base station the set of hyper-parameters when determining the power threshold to use for transmission in the sampling period.

5. The method according to claim 4, wherein the method further comprises: by the base station determining a value for power consumption corresponding to the performed transmission, wherein the determining the power threshold to use, performing the transmission, and determining the value are performed in order to perform the storing multiple power thresholds.

6. The method according to claim 5, wherein determining the set of admissible power thresholds comprises:

in response to a beginning of the sampling period, updating a range of admissible power thresholds, such that:

a sliding average of a function's transmitted power does not exceed an upper limit; and future power thresholds never drop below a lower limit, wherein the updated range of admissible power thresholds is the set of admission power thresholds.

7. An apparatus for a base station, the apparatus comprising:

a processor configured to determine a power threshold to use for transmission in a sampling period in order to meet a power requirement defined to limit an amount of a function of radiated power by:

determining a set of admissible power thresholds;

measuring overshoot in transmitted power; and computing the power threshold to be used for the transmission, as a function of the measured overshoot and the set of admissible power thresholds, to form the determined power threshold; and perform by the base station the transmission in the sampling period using the determined power threshold.

8. The apparatus according to claim 7, wherein the processor is configured to determine the power threshold to use for transmission in the sampling period in a first time scale and perform the following in a second time scale:

store multiple power thresholds used by the base station for transmission over multiple time periods and storing corresponding multiple power consumption values over those multiple time periods;

send, by the base station to a network node, the multiple power thresholds and corresponding multiple power consumption values;

receive, by the base station from the network node, a set of hyper-parameters for determination of power thresholds for transmission; and use by the base station the set of hyper-parameters when determining the power threshold to use for transmission in the sampling period.

9. The apparatus according to claim 7, wherein the processor is configured to determine the power threshold to use for transmission in the sampling period in a first time scale and perform the following in a second time scale:

store multiple power thresholds used by the base station for transmission over multiple time periods and storing corresponding multiple power consumption values over those multiple time periods;

identify a set of hyper-parameters that improve expected performance in terms of power threshold fairness using the multiple power threshold and multiple power consumption values; and use by the base station the set of hyper-parameters when determining the power threshold to use for transmission in the sampling period.

10. The apparatus according to claim 3, wherein the processor is configured to cause the base station to determine a value for power consumption corresponding to the performed transmission, wherein the processor is configured to determine the power threshold to use, perform the transmission, and determine the value in order to perform the storing multiple power thresholds.

11. The apparatus according to claim 10, wherein the processor is configured to determine the set of admissible power thresholds by:

in response to a beginning of the sampling period, updating a range of admissible power thresholds, such that:

a sliding average of a function's transmitted power does not exceed an upper limit; and future power thresholds never drop below a lower limit, wherein the updated range of admissible power thresholds is the set of admission power thresholds.

12. The apparatus according to claim 11, wherein measuring overshoot in transmitted power comprises updating a virtual queue measuring an amount of a function of transmitted power exceeding a constraint over a number of recent sampling periods, the amount being the overshoot.

13. The apparatus according to claim 12, wherein computing the power threshold to be used for the transmission comprises computing the power threshold $\gamma_t$ for an upcoming period t, as a function $f_\theta(Q_t, \Gamma_t)$ of the virtual queue $Q_t$ and of the set of admissible thresholds $\Gamma_t$, where $f_\theta$ is decreasing with respect to the virtual queue $Q_t$; and depending on a set of hyper-parameters, $\theta$.

14. The apparatus according to claim 13, wherein function $f_\theta$ is instantiated using the following Lyapunov optimization technique:

$$\max \quad \lim_{T \to \infty} \frac{1}{T} \sum_{t=0}^{T-1} h(\gamma_t),$$

$$\text{s.t.} \quad \lim_{T \to \infty} \frac{1}{T} \sum_{t=0}^{T-1} c_t(\gamma_t) \leq \bar{C},$$

where $h(\cdot)$ is a fairness function, increasing in $\gamma$ and penalizing values of power thresholds $\gamma$ that meet one or more criteria to ensure a behavior of $\gamma$ over time that is smoother than without the penalizing, $c_t$ is a power consumption function within sampling period t=0, 1, . . . , $\gamma_t$ is a power threshold that is controlled for sampling period t.

15. The apparatus according to claim 14, wherein the set of hyper-parameters are $\theta=[\beta, V, \rho]$, having values $0<\beta<1$, $V>0$, $0\leq\rho\leq1$, where $\beta$ is used in determination of the virtual queue $Q_t$, V is used to determine the function $f_\theta(Q_t, \Gamma_t)$, and $\rho$ is used to calculate the lower limit over which future power thresholds never drop below.

16. The apparatus according to claim 15, wherein the function of the radiated power is equivalent isotropic radiated power, and the power thresholds are expressed as equivalent isotropic radiated power.

17. The apparatus according to claim 16, wherein the processor is configured to determine power threshold is to determine one of the following for the transmission:

a number of sub-carriers to use to serve users;

a power of a beam allocated to a specific user and at a specific slot;

a gain of a beam used by each user in each slot; or how to control jointly a number of carriers, beam power, and beam gain.

18. An apparatus comprising:

a processor configured to:

receive multiple power thresholds used by a base station for transmission over multiple time periods and corresponding multiple power consumption values over those multiple time periods;

identify a set of hyper-parameters that improve expected performance in terms of power threshold fairness using the multiple power thresholds and multiple power consumption values; and send the set of hyper-parameters to the base station for use by the base station for determination of power thresholds for transmission.

19. The apparatus according to claim 18, wherein the processor is configured to find the set of hyper-parameters by estimating a value of performance $H(\theta)$, which is based on fairness, in correspondence of the hyper-parameters used in multiple batches of sampling periods.

20. The apparatus according to claim 19, wherein the processor is configured to find the set of hyper-parameters by finding a set of hyper-parameters ($\theta$) at a batch i of the multiple batches of sampling periods, retrieving previously stored choices of sets of hyper-parameters and corresponding performances, and using a technique allowing optimization of a function by sampling the function at selected points.

\* \* \* \* \*